US010994807B2

(12) United States Patent
Langlois (10) Patent No.: US 10,994,807 B2
(45) Date of Patent: *May 4, 2021

(54) TRANSOM MOUNTED BRACKET FOR A FLUID HINGE TRIM TAB SYSTEM

(71) Applicant: Joseph R. Langlois, Pompano Beach, FL (US)

(72) Inventor: Joseph R. Langlois, Pompano Beach, FL (US)

( * ) Notice: Subject to any disclaimer, the term of this patent is extended or adjusted under 35 U.S.C. 154(b) by 104 days.

This patent is subject to a terminal disclaimer.

(21) Appl. No.: 16/432,393

(22) Filed: Jun. 5, 2019

(65) Prior Publication Data

US 2019/0300122 A1 Oct. 3, 2019

Related U.S. Application Data

(63) Continuation-in-part of application No. 16/375,453, filed on Apr. 4, 2019, now Pat. No. 10,513,312, and a continuation-in-part of application No. 16/032,653, filed on Jul. 11, 2018, now Pat. No. 10,358,195, and a continuation-in-part of application No. 15/617,365, filed on Jun. 8, 2017, now Pat. No. 10,315,737, and a continuation-in-part of application No. 14/997,244, filed on Jan. 15, 2016, now abandoned.

(51) Int. Cl.
*B63B 1/22* (2006.01)
*B63B 39/06* (2006.01)
*B63B 1/32* (2006.01)

(52) U.S. Cl.
CPC .............. *B63B 1/22* (2013.01); *B63B 1/32* (2013.01); *B63B 39/061* (2013.01)

(58) Field of Classification Search
CPC .... B63B 1/22; B63B 1/32; B63B 1/16; B63B 1/18; B63B 2001/183; B63B 1/24; B63B 1/242; B63B 1/248; B63B 1/26; B63B 1/28; B63B 1/285; B63B 1/286; B63B 1/30; B63B 2001/325; B63B 1/36; B63B 39/06; B63B 39/061
USPC ........ 114/271, 274, 278, 280, 282, 284, 285
See application file for complete search history.

(56) References Cited

U.S. PATENT DOCUMENTS 3,371,642 A * 3/1968 Joy ...................... B63B 39/061
114/285
3,399,643 A * 9/1968 Bennett ................. B63B 39/061
114/285

(Continued)

*Primary Examiner* — Daniel V Venne
(74) *Attorney, Agent, or Firm* — Melvin K. Silverman (57) ABSTRACT

A transom mounted fluid hinge bracket having one mounting plate that is connected at a lower distal end to a horizontal bracket portion which extends forward and aft of the transom of a watercraft in a bow to stern axial displacement, the horizontal bracket abutting the underside of the hull of a watercraft sitting flush with the underside of the watercraft, at least one fluid hinge receiver secured to the back side of the horizontal bracket portion on which the back of the substantially planar surface of the trim tab may rest, the at least one fluid hinge receiver containing the substantially planar surface in a position of the planar surface resting about parallel to the hull of the watercraft, and the at least one fluid hinge receiver without any load from the planar surface except at rest keeping the planar surface from descending below a horizon parallel to that of a horizon of the hull.

13 Claims, 7 Drawing Sheets

(56) References Cited

U.S. PATENT DOCUMENTS

| | | | | |
|---|---|---|---|---|
| 3,463,109 A * | 8/1969 | Weiler | ................. | B63B 39/061 |
| | | | | 114/286 |
| 3,628,487 A * | 12/1971 | Bennett | ................ | B63B 39/061 |
| | | | | 114/287 |
| 3,678,874 A * | 7/1972 | Flink | ........................ | B63B 1/22 |
| | | | | 114/285 |
| 3,977,349 A * | 8/1976 | Hummel | ............... | B63B 39/061 |
| | | | | 114/287 |
| 4,896,622 A * | 1/1990 | Thomas | ................ | B63B 39/061 |
| | | | | 114/271 |
| 4,909,175 A * | 3/1990 | Arnseson | ............. | B63B 39/061 |
| | | | | 114/285 |
| 4,967,682 A * | 11/1990 | O'Donnell | ............ | B63B 39/061 |
| | | | | 114/286 |
| 6,167,830 B1 * | 1/2001 | Pilger | ................... | B63B 39/061 |
| | | | | 114/285 |
| 7,188,581 B1 * | 3/2007 | Davis | .................... | B63H 25/42 |
| | | | | 114/285 |
| 10,005,527 B2 * | 6/2018 | Langlois | ............... | B63B 39/061 |
| 10,035,571 B1 * | 7/2018 | Langlois | ............... | B63B 39/061 |
| 10,315,737 B2 * | 6/2019 | Langlois | ................... | B63B 1/32 |
| 10,358,195 B1 * | 7/2019 | Langlois | ............... | B63B 39/061 |
| 10,513,312 B2 * | 12/2019 | Langlois | ............... | B63B 39/061 |
| 2008/0257247 A1 * | 10/2008 | Crews | ................. | B63B 39/061 |
| | | | | 114/285 |

\* cited by examiner

TRANSOM MOUNTED BRACKET FOR A FLUID HINGE TRIM TAB SYSTEM

CROSS REFERENCE TO RELATED APPLICATIONS

The application is a continuation-in-part of application Ser. No. 15/617,365, filed Jun. 8, 2017, which is a continuation-in-part of patent application Ser. No. 14/997,244, filed on Jan. 15, 2016, now abandoned. All prior related patents and patent applications are herein incorporated by reference in their entirety.

FIELD OF THE INVENTION

The present invention relates to an improvement in classical trim-tab technology to enhance the general hydrodynamic performance of a marine craft inclusive of the fuel efficiency thereof.

BACKGROUND OF THE INVENTION

So-called boat leveling devices of the trim-tab type have been known for many years and various forms of them have been developed in an effort to maximize attitude control, stability of the marine craft and general hydrodynamic efficiency inclusive of decrease of flow velocity under the hull and fuel efficiency.

It is known in the art to provide a trim-tab with a physical coupling takes place at the hinging point between the flat surface of the trim-tab and the hull of a watercraft to which it attaches. This physical coupling has come in the form of a pivoting hinge, as can be seen in the prior art shown in FIG. 1, or in the form of a hinge, as can be seen in the prior art shown in FIG. 2.

Figure 1:
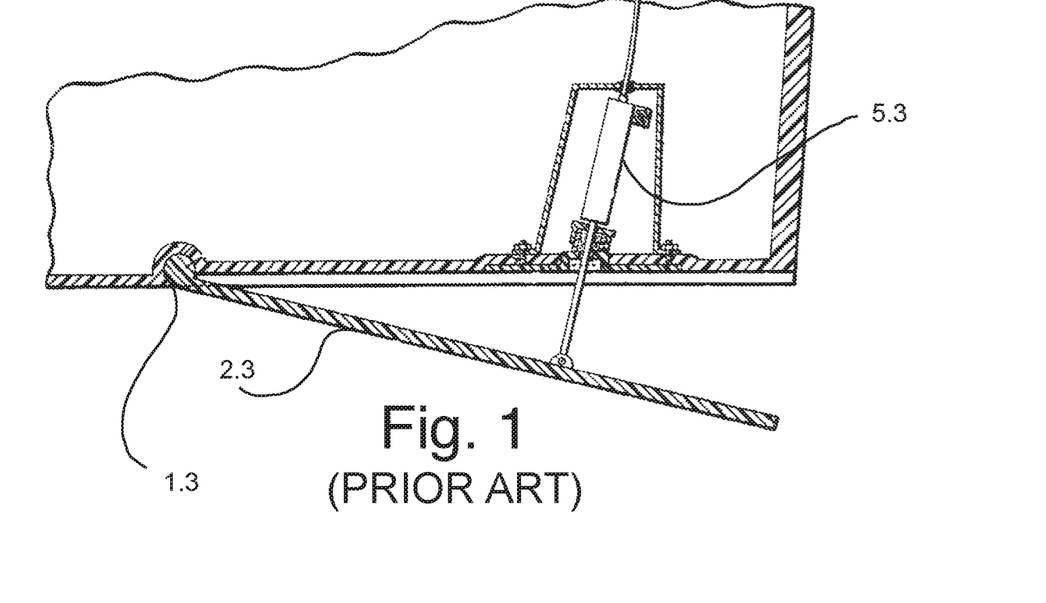
FIG. 1: Prior Art as shown in Arnesson U.S. Pat. No. 4,909,175.

The prior art shown in FIG. 1, Arnseson U.S. Pat. No. 4,909,175, demonstrates the hinge common in most trim tabs, that is, a pivot hinge 1.3 that fastens the planar surface 2.3 of the trim tab to the watercraft. The pivot hinge is fixed in a specific location, and requires an actuator 5.3, mounted at an non-right angle to allow the planar surface to descend.

Figure 2:
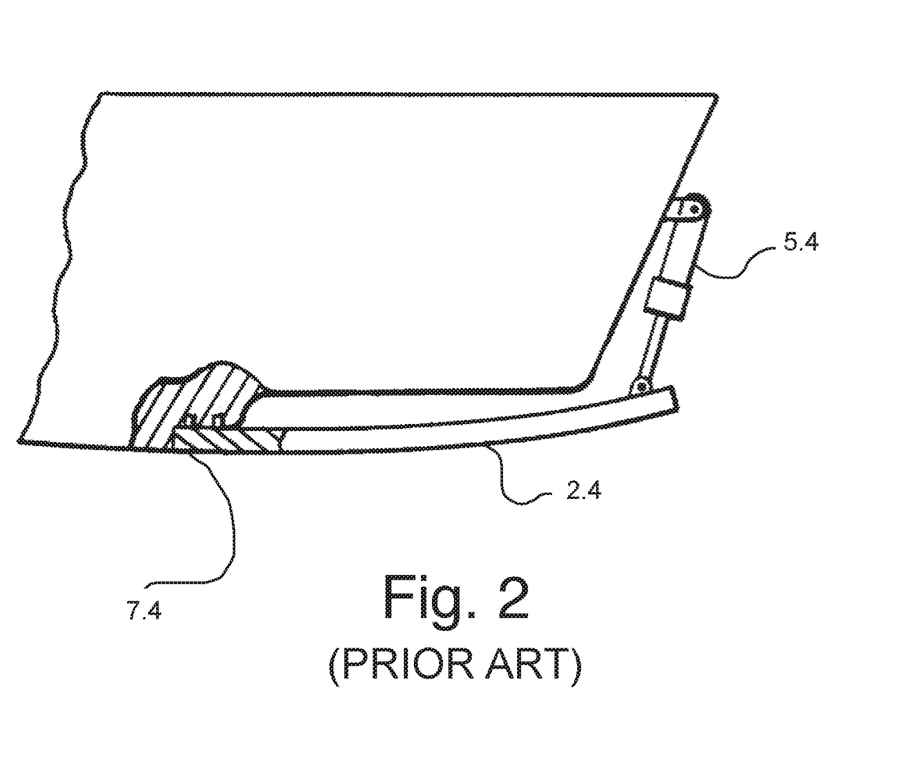
FIG. 2: Prior Art as shown in Weiler, U.S. Pat. No. 3,463,109.

The prior art shown in FIG. 2, Weiler, U.S. Pat. No. 3,463,109, shows a similar issue where the planar surface 2.4 is fastened directly to the hull of the watercraft by a living hinge 7.4. This living hinge 7.4 is in a fixed location as well, and thus requires an actuator 5.4 mounted at a non-right angle, or the actuator 5.4 with a pivot mount to allow the planar surface 2.4 of the trim tab to descend.

There are significant differences between the prior art and the current invention. Primarily, the use of a living hinge as in the prior art of Arnseson U.S. Pat. No. 4,909,175 and Weiler, U.S. Pat. No. 3,463,109, do not allow an extent of slidability for the trim tabs it connects. Arnseson uses a living hinge 7.4, which is a thin flexible hinge made from the same material as the two rigid pieces it connects. Weiler uses a pivot hinge 1.3, which allows its trim tab 2.3 to raise and lower, but is limited to pivoting around its connection point. Thus, there exists a need for a fluid-hinge to allow slidability of the trim tab it connects.

These hinges in the prior art make changing a trim tab a difficult task. If a trim tab is damaged, or needs to be replaced, the operator removing the tab may further cause damage or destroy the trim-tab, as well as damage the hull of the watercraft it attaches to.

Further, an aspect that is prevalent in the prior art is the need to drill into the bottom surface of the hull of the watercraft. Not only is it a very precise process to tap holes into the bottom surface of the hull, but it requires sufficiently strong sealant to create buffers between the inside of the hull and the water. The present invention eliminates the need to drill holes in the bottom surface of the hull of a watercraft.

The present inventor has obtained patents in the general area of marine technology, such as U.S. Pat. Nos. 10,035,571 B1, and 10,005,527 B2.

SUMMARY OF THE INVENTION

The instant invention relates to hinging mechanisms in a trim-tab system. The invention provides at least one mounting plate that is connected at a lower distal end to a horizontal bracket portion. The horizontal bracket portion extends forward and aft of the transom of a watercraft in a bow to stern axial displacement. The horizontal bracket abuts the underside of the hull of a watercraft sitting flush with the underside of the watercraft. At least one fluid hinge receiver is secured to the back side of the horizontal bracket portion on which the back of the substantially planar surface of the trim tab may rest, the at least one fluid hinge receiver contains the substantially planar surface in a position of the planar surface resting about parallel to the hull of the watercraft; and the at least one fluid hinge receiver is without any load from the planar surface except at rest keeping the planar surface from descending below a horizon parallel to that of a horizon of the hull.

It is accordingly an object of the present invention to provide an improved trim tab system which overcomes the various hydrodynamic limitations of the prior art, the same having utility with leisure as well as naval vessels.

It is also accordingly an object of the invention to eliminate any drilling or tapping into the bottom surface of the hull of a watercraft to secure the planar surface.

The present invention also seeks to increase efficiency of removing and replacing a trim tab, for various reasons including replacement and cleaning, by allowing the user to disconnect the actuator from the trim tab, and slide the trim tab out of the capture of the fluid hinge, and thereby lessoning time-consumption and damage to the watercraft or trim tab due to removal as a result.

The above and yet other objects and advantages of the present invention will become apparent from the hereinafter set forth Brief Description of the Drawings, Detailed Description of the Invention and Claims appended herewith.

DETAILED DESCRIPTION OF THE INVENTION

Figures 3, 3A:
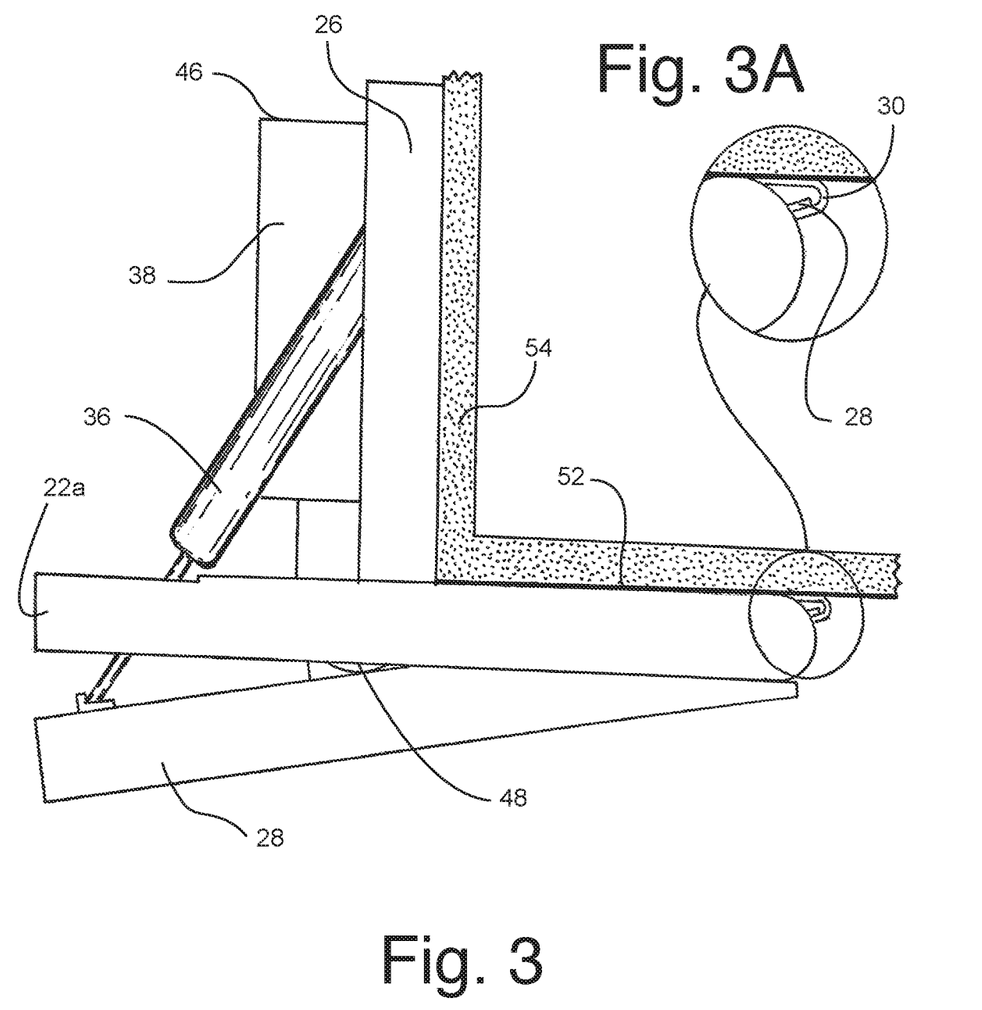
FIG. 3: A conceptual side view of the present invention with the planar surface in an extended position.
FIG. 3a: An isolated, enlarged view of the fluid hinge connection between the fluid hinge receiver and planar surface with the planar surface in the extended position.
Figures 4, 4A:
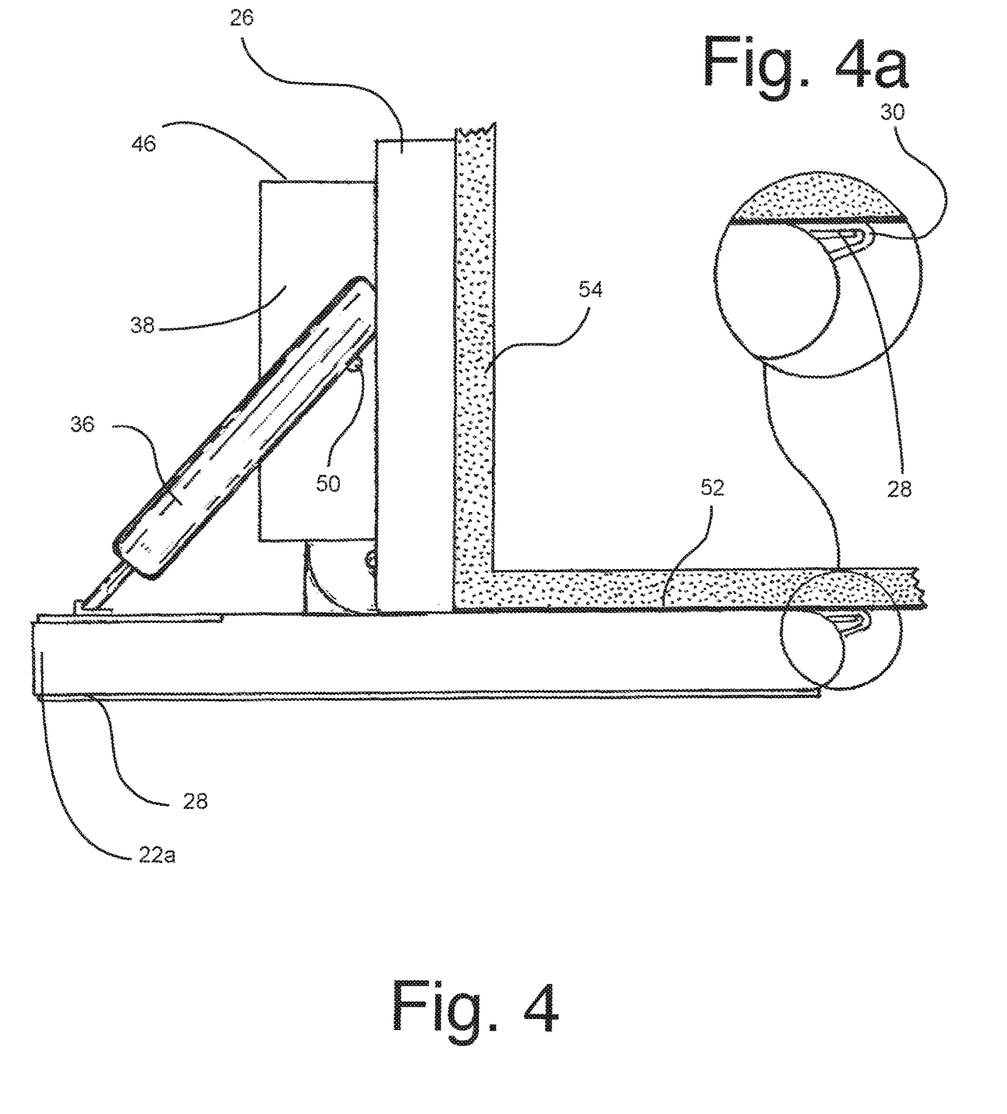
FIG. 4: A conceptual side view of the present invention with the planar surface in a retracted position.
FIG. 4a: An isolated, enlarged view of the fluid hinge connection between the fluid hinge receiver and planar surface with the planar surface in the retracted position.
Figure 5:
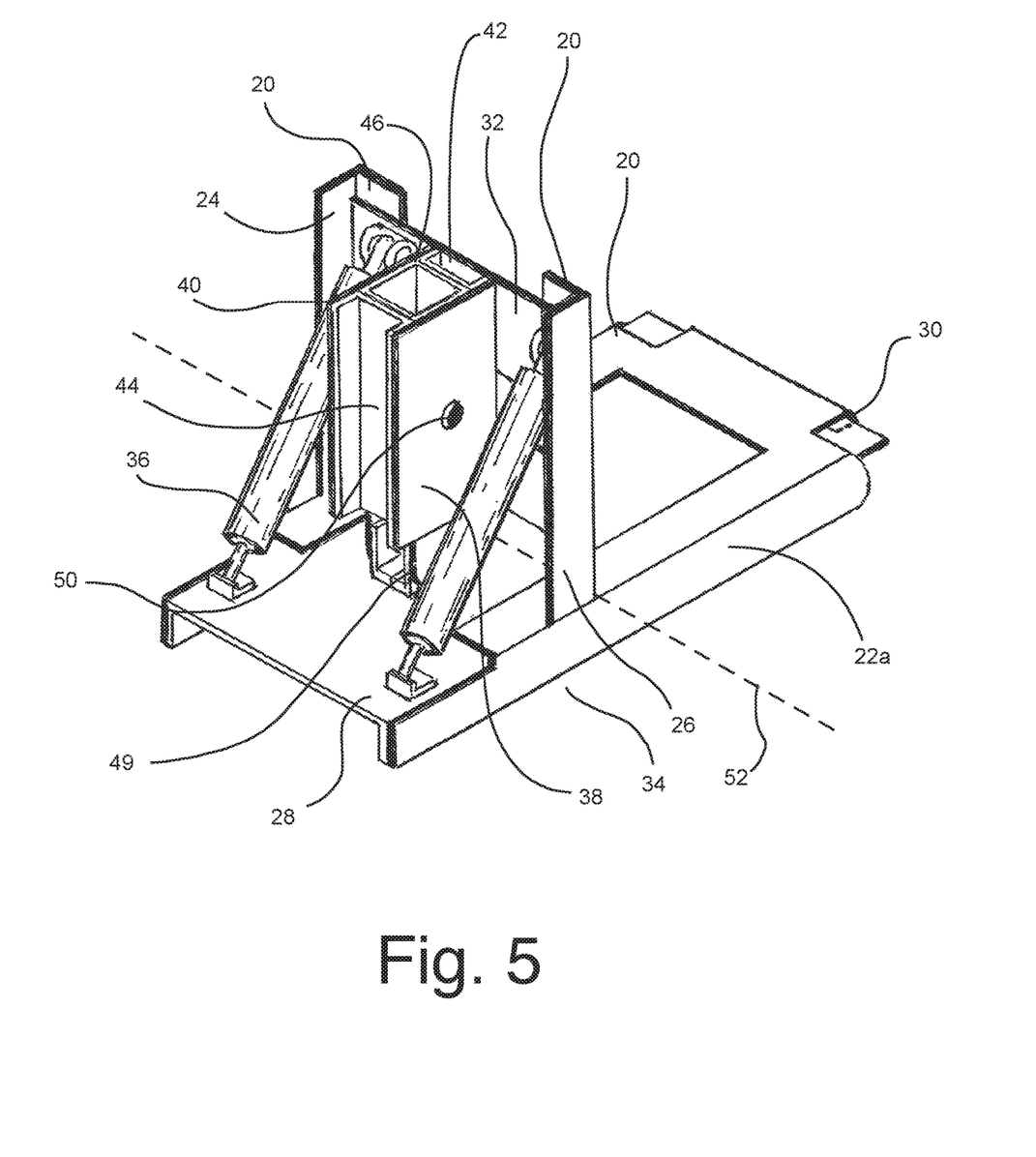
FIG. 5: A perspective view of the present invention showing the planar surface in a retracted position

In FIG. 5, a perspective view of the present invention is shown. The invention presents a mounting plates 20a. The mounting plates 20/20a are welded or bolted to the horizontal bracket portion 22/22a. FIG. 5 shows the preferred embodiment of the invention, the mounting plate is shown having two structural side walls, left structural side wall 26 and right structural side wall 24. The structural side walls 24/26 contain two horizontal mounting brackets, top horizontal mounting bracket 32 and bottom horizontal mounting bracket 34. The top horizontal mounting bracket 32 allows for the fixing of the upper portion of at least one actuator 36 to rigidly affix the actuator 36 relative to the transom 54 of a watercraft (shown in FIGS. 3 and 4), this rigidly affixed connection only allows for pivoting of the actuator 36 about an arc length. In a further embodiment, the actuator 36 is capable of be mounted directly to the transom 54 of the watercraft. The actuator 36 can be of any type, including but not limited to: mechanical, electromechanical, hydraulic, or manual type actuators.

Figure 6:
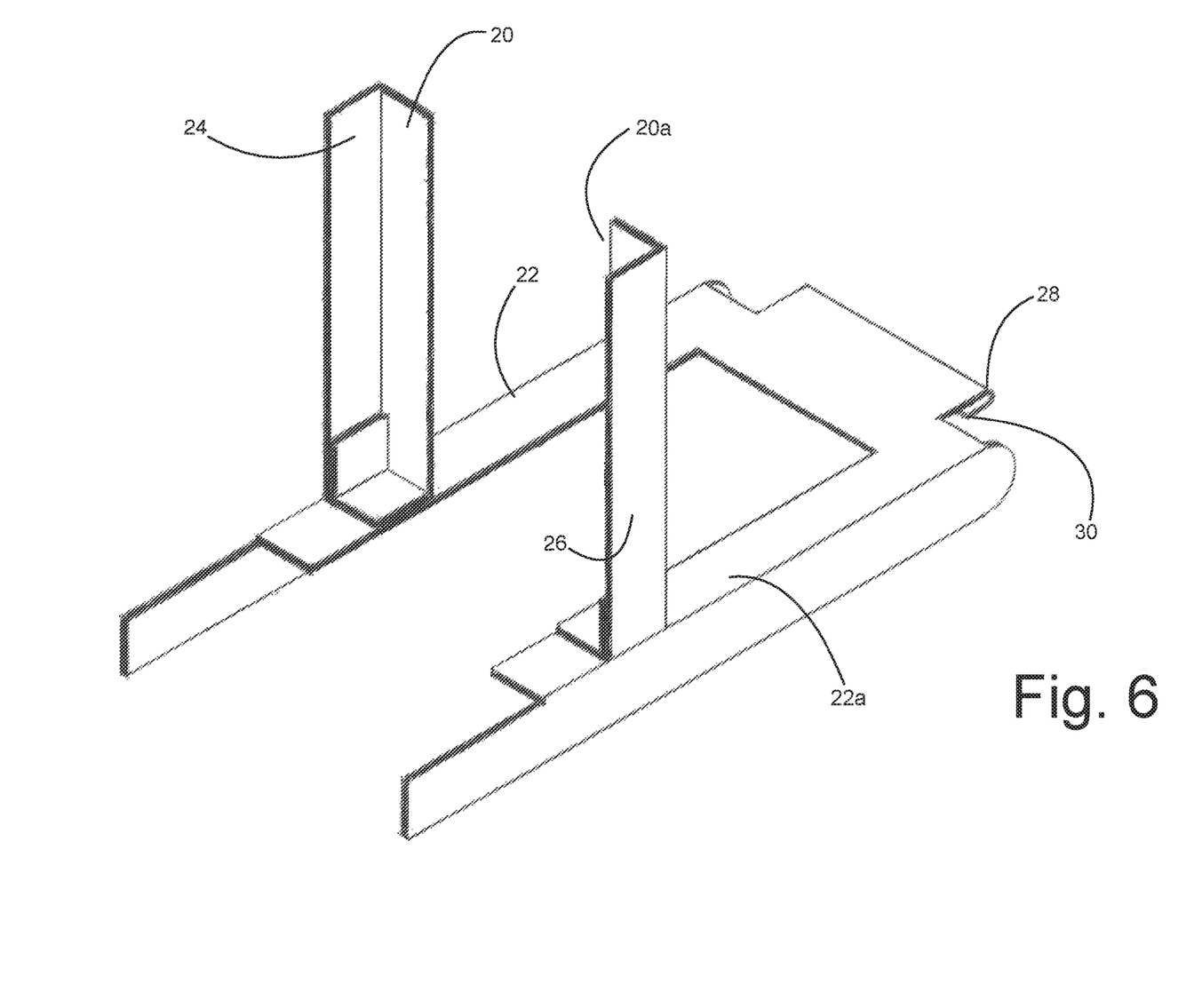
FIG. 6: An isolated view of the overall transom mounted bracket element of the present invention.

Continuing with FIG. 6, the structural sidewalls 24/26 of the mounting plates 20/20a are rigidly affixed to the horizontal bracket portion 22/22a. The horizontal bracket portion 22/22a makes up the bottom half of the overall transom mounted fluid hinge bracket. The connection of the structural sidewalls 24/26 of the mounting plates 20/20a can either be a bolted or welded connections. It is important that the structural sidewalls 24/26 of the mounting plates 20/20a and horizontal bracket portion 22/22a, both seen in FIG. 5, be fabricated from high strength materials to be able to deal with the forces and stresses acting on the system from the flow of water passing beneath the hull 52 of the watercraft, along with the forces transferred from the planar surface 28. The horizontal bracket portion 22/22a is configured in such a way as to fit flush, or as close to flush as possible, to the bottom surface of the hull 52, while maintaining a tight fitting to the watercraft surface throughout the assembly.

Looking at FIGS. 3-6, an aft-to-bow orientation, a fluid hinge receiver 30 can be seen at an end of the horizontal bracket portion 22/22a. The term "fluid hinge" refers to a non-fixed connection between a planar surface 28 and the bottom of the hull of the watercraft 52. The term "non-fixed" refers to the properties of the fluid hinge that allow the planar surface to rest at low or no speed, but does not restrict the motion needed from the movement of the planar surface 28 between raised and lowered positions of the rear of the trim tab, and further, the fluid hinge is not physically fastened to the planar surface 28, shown in FIGS. 3a and 4a. The fluid hinge in the present invention incorporates a fluid hinge receiver 30 that is used to capture the slidable motion of a planar surface 28 (e.g., a trim tab) and allow for the planar surface 28 to move as water begins to pass beneath the hull. The force of the water abutting the planar surface 28 causes the planar surface to be slid up against the fluid hinge receiver 30, holding the planar surface 28 in place. As velocity of the flow of water beneath the hull increases, the planar surface 28 will rise due to the forces of the water acting upon the surface, and as the velocity returns to idle the planar surface 28 will fall back to rest on the bottom surface of the fluid hinge receiver, this demonstrated in FIGS. 3, 3a, 4, and 4a. The present invention can be configured to work with just about any shape planar surface, and for example, in FIG. 5, the planar surface can be seen with a stiffener 49 that is abutted to the top surface of the upside down U-shaped planar surface.

The fluid hinge receiver 30 can be further defined as a shelf-like bracket, hereinafter referred to as a "shelf-bracket" meaning that the receiver is substantially a bracket that holds and supports the planar surface, like a shelf, but does not fix it to one pivoting position.

Figure 7:
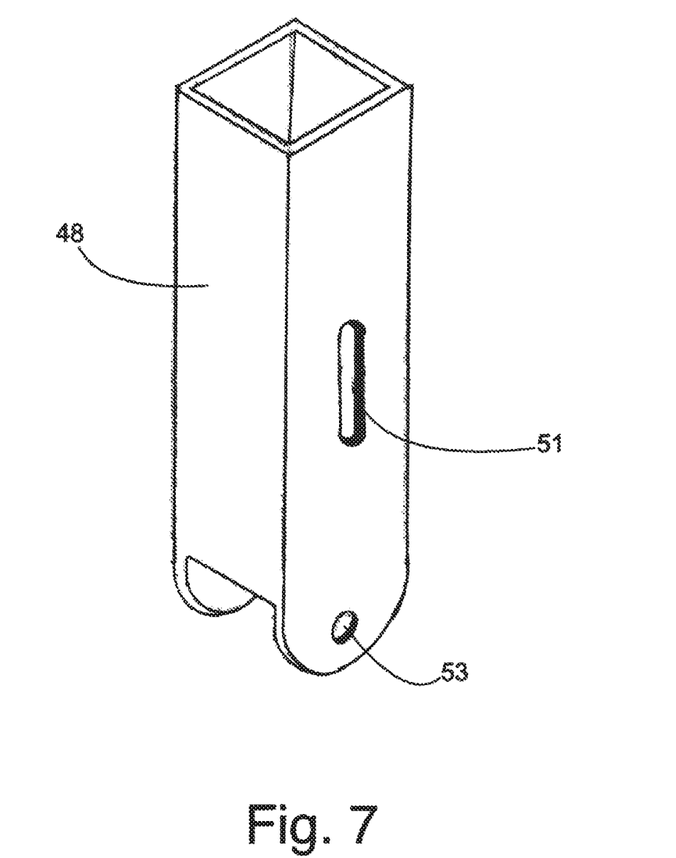
FIG. 7: An isolated view of the locking guide and locking slot.

A deeper look into in FIG. 5, shows the desired embodiment with a locking system that is mountable to the top horizontal mounting bracket 32 and bottom horizontal mounting bracket 34. From what can be seen in FIG. 5, the locking system has a housing 46 made up of a left side 38 and right side 30, front side 42 and back side 44. Within that housing is a locking guide 48 (seen in FIG. 3) and a locking slot 51 both shown in FIG. 7. As may be seen in FIGS. 5 and 8, the left side 38 and right side 40 of the housing 46 are configured with a pin hole 50 that can be plugged with a locking bolt, or another locking element that can hold the planar surface 28 in place, through the locking slot 51. Though not fully shown, but can be seen partially in FIG. 3, the locking guide 48 slides within the housing 46 and is connected at a bottom end to the top surface of the planar surface 28 at connection hole 53 shown in FIG. 7.

Figure 8:
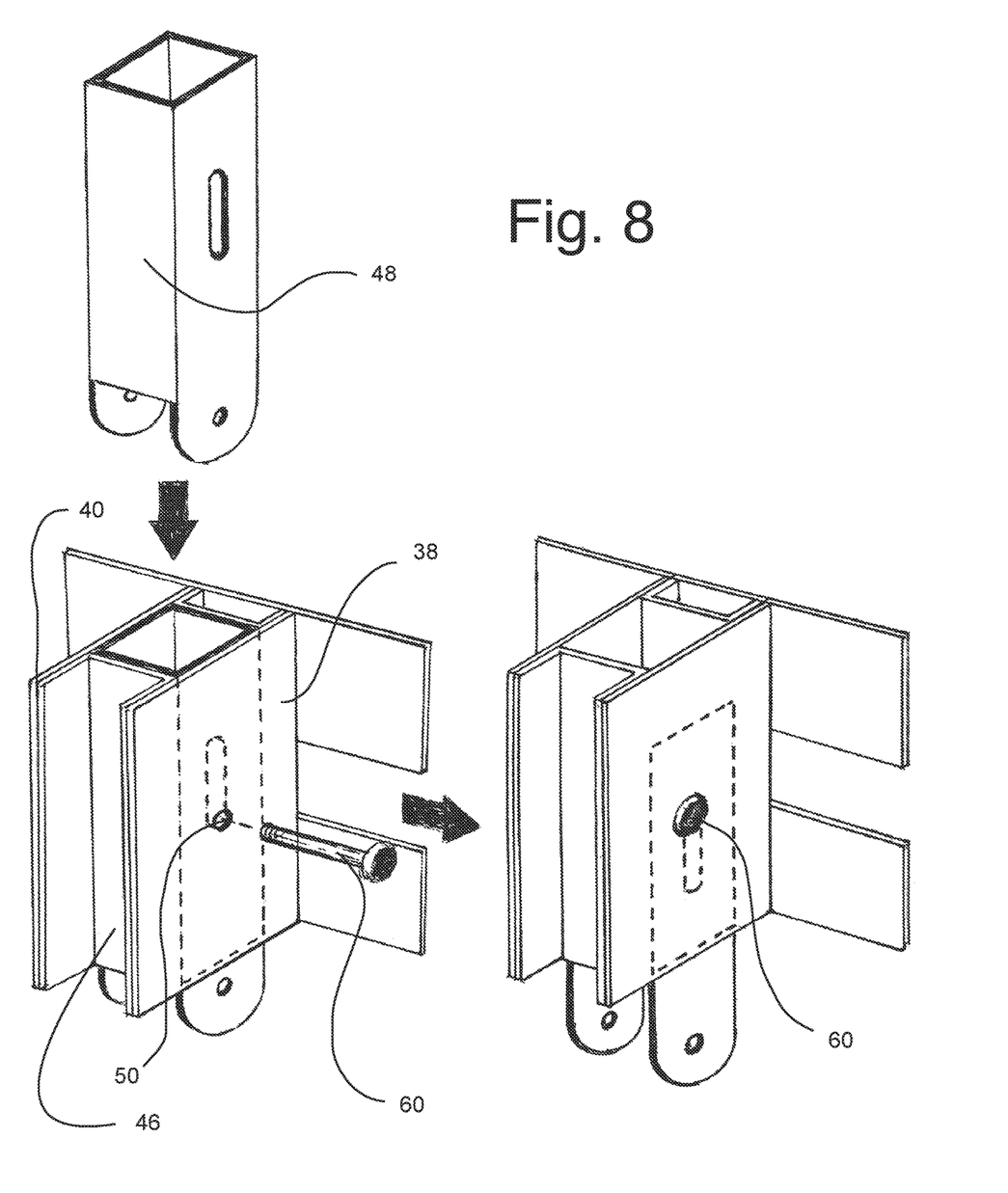
FIG. 8: An additional multi-part view of the locking guide and locking slot.

FIG. 8 shows the insertion of the locking guide 48, in the locking system housing 46, with left side 38, and right side 30. Also shown is the pin 60, that fits in pin hole 50, and the engagement thereof.

While there has been shown and described above the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

I claim:

1. A bracket for a transom-mounted fluid hinge system, comprising:
   at least one mounting plate;
   said at least one mounting plate connected at a lower distal end to a horizontal bracket portion, wherein said horizontal bracket portion extends forward and aft of a transom of a watercraft in bow to stern axial displacement;
   said horizontal bracket portion abutting an underside of a hull of a watercraft sitting flush with the underside of said watercraft;
   at least one fluid hinge receiver located at a forward distal end of the horizontal bracket portion to contain a planar surface of a trim tab; and
   said fluid hinge receiver is without any load from the planar surface except at rest keeping the planar surface from descending below a horizon parallel to that of a horizon of the hull.

2. The bracket for a transom-mounted fluid hinge system as recited in claim 1, further comprising:
   at least one structural side wall mounted to said horizontal bracket portion.

3. The bracket for a transom-mounted fluid hinge system as recited in claim 1, further comprising:
   at least one horizontal leg as a part of said horizontal bracket portion.

4. The bracket for a transom-mounted fluid hinge system as recited in claim 1, further comprising:

said at least one mounting plate is made up of a top mounting plate and bottom mounting plate.

5. The bracket for a transom-mounted fluid hinge system as recited in claim 1, further comprising:
at least one actuator pivotally connected at a proximal end of said at least one actuator to a horizontal mounting bracket, at least one actuator having both extendable and retractable features, said at least one actuator connected at a distal end to said planar surface.

6. The bracket for a transom-mounted fluid hinge system as recited in claim 5,
wherein said at least one actuator is further defined as:
at least one mechanical type actuator.

7. The bracket for a transom-mounted fluid hinge system as recited in claim 5,
wherein said at least one actuator is further defined as:
at least one electrical type actuator.

8. The bracket for a transom-mounted fluid hinge system as recited in claim 5,
wherein said at least one actuator is further defined as:
at least one hydraulic type actuator.

9. The bracket for a transom-mounted fluid hinge system as recited in claim 5,
wherein said at least one actuator is further defined as:
at least one manual type actuator.

10. The bracket for a transom-mounted fluid hinge system as recited in claim 5,
wherein each of said at least one actuator is connected at a proximal end to the transom of said watercraft.

11. The bracket for a transom-mounted fluid hinge system as recited in claim 1, further comprising:
a locking system having a housing, said housing having a left side, right side, front side, and back side;
said housing having a locking guide with at least one locking slot;
said locking guide fixed within said housing;
said left side and right side of said housing having a pin hole; and
said pin hole configured to allow a pin to pass through said left side and right side, said pin also slottable through said at least one locking slot.

12. The bracket for a transom-mounted fluid hinge system as recited in claim 11,
wherein said housing is mountable at a top side of a top horizontal mounting bracket, said housing is also mountable at a bottom side of a bottom horizontal mounting bracket.

13. The bracket for a transom-mounted fluid hinge system as recited in claim 11,
wherein said locking guide connected at a bottom end to a planar surface mount, said planar surface mount fixed to a top side of said planar surface.

* * * * *